United States Patent [19]

Pankov

[11] Patent Number: 4,785,844
[45] Date of Patent: Nov. 22, 1988

[54] DOUBLE-SEAL FLEXIBLE GATE VALVE

[75] Inventor: Ivan Pankov, Willowbrook, Ill.

[73] Assignee: C & S Valve Company, Westmont, Ill.

[21] Appl. No.: 89,575

[22] Filed: Aug. 26, 1987

[51] Int. Cl.$^4$ .................... F16K 3/18; F16K 25/00
[52] U.S. Cl. .................... 137/242; 137/240; 137/312; 251/158; 251/203; 251/326; 251/328; 251/334
[58] Field of Search ............... 137/240, 312, 614.18, 137/242; 251/158, 176, 203, 326, 328, 334, 204

[56] References Cited

U.S. PATENT DOCUMENTS

| 676,580 | 6/1901 | French | 251/334 |
|---|---|---|---|
| 989,202 | 4/1911 | Snow | 251/158 |
| 1,235,409 | 7/1917 | Aldrich | 137/240 |
| 1,826,941 | 10/1931 | La Mont | 251/203 |
| 1,847,385 | 3/1932 | Dengler | 251/334 |
| 2,128,542 | 8/1938 | Snow | 251/158 |
| 2,893,685 | 7/1959 | Van Camp | 251/334 |
| 2,947,511 | 8/1960 | McInnes | 251/203 |
| 3,554,486 | 1/1971 | Thebado | 251/204 |
| 4,131,131 | 12/1978 | Frisch | 137/559 |
| 4,304,251 | 12/1981 | Schadel et al. | 137/240 |
| 4,687,015 | 8/1987 | Mieth | 137/312 |

Primary Examiner—George L. Walton
Attorney, Agent, or Firm—Fitch, Even, Tabin & Flannery

[57] ABSTRACT

Disclosed is a gate valve for controlling flow, providing a dual seal, including a valve body having a discharge orifice. A gate assembly, located upstream of the discharge orifice, is movable between open and closed positions remote from and blocking the discharge orifice, respectively. The gate assembly includes upper and lower spaced flexible sealing disks which are attached to a relatively rigid upstream backup plate. Radially inner and outer valve seats are secured to the valve body adjacent the discharge orifice. When blocking flow through the valve body, each gate is wedged in sealing engagement with a respective valve seat and a chamber is formed between the two seals to receive seepage past the upstream seal. The chamber may be either evacuated or pressurized to prevent flow of controlled material past the lower or downstream seal. A camming bar attached to the gate assembly has upstream extending arms with inclined ends which engage inclined bars mounted to an upstream portion of the valve body, urging the gates into sealing engagement with their respective valve seats.

8 Claims, 2 Drawing Sheets

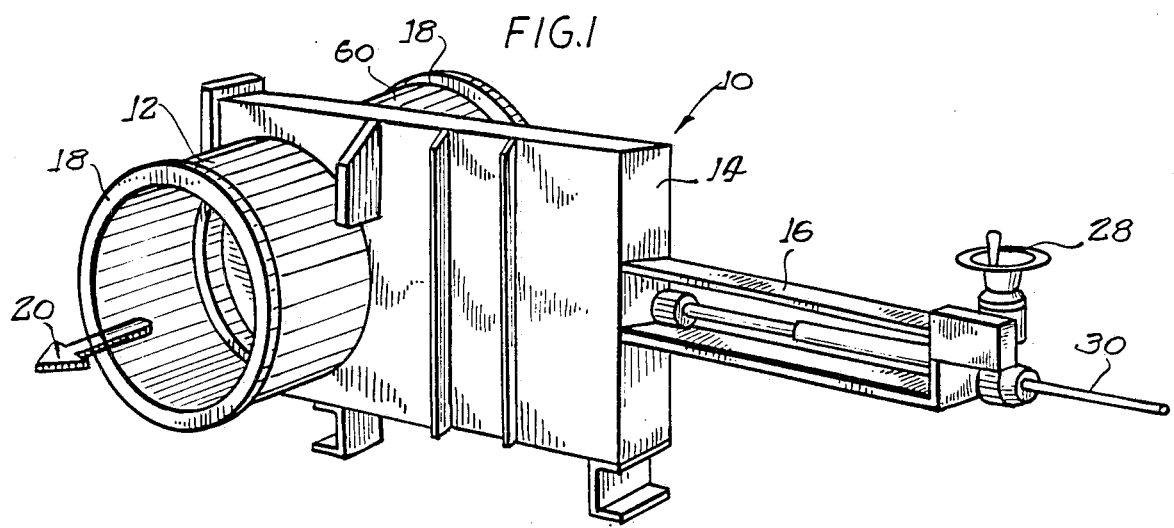
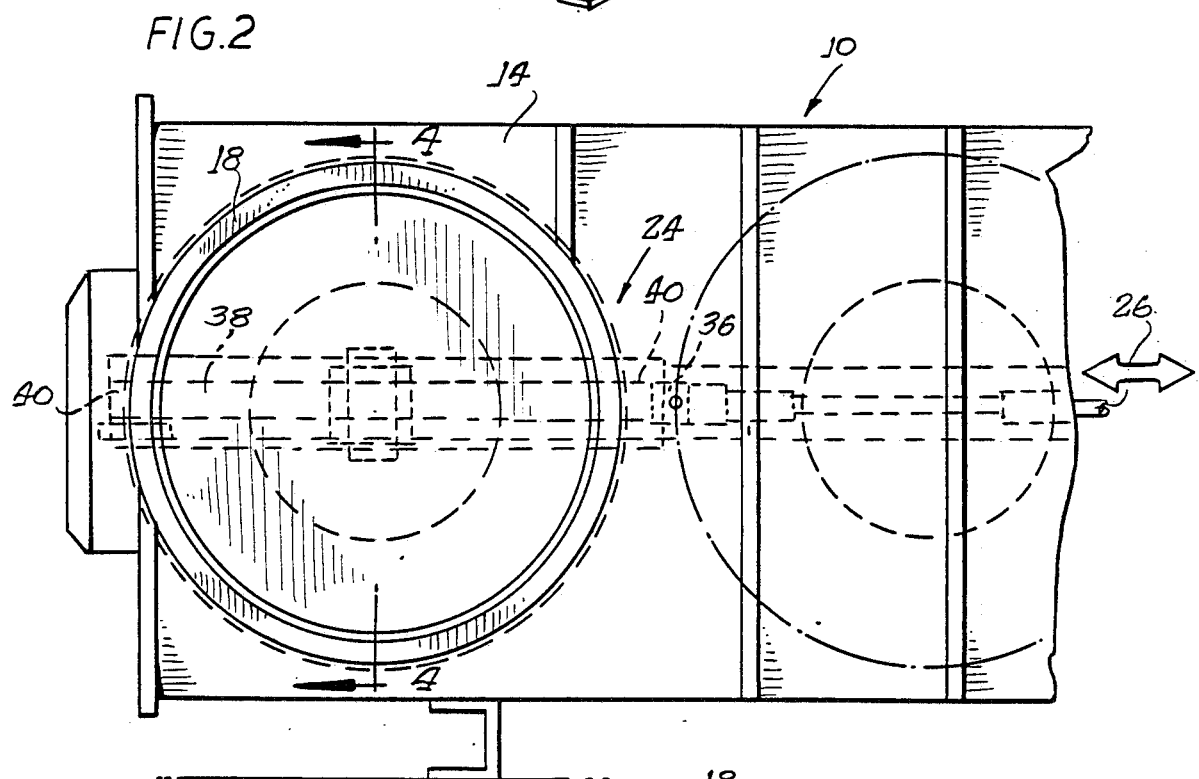
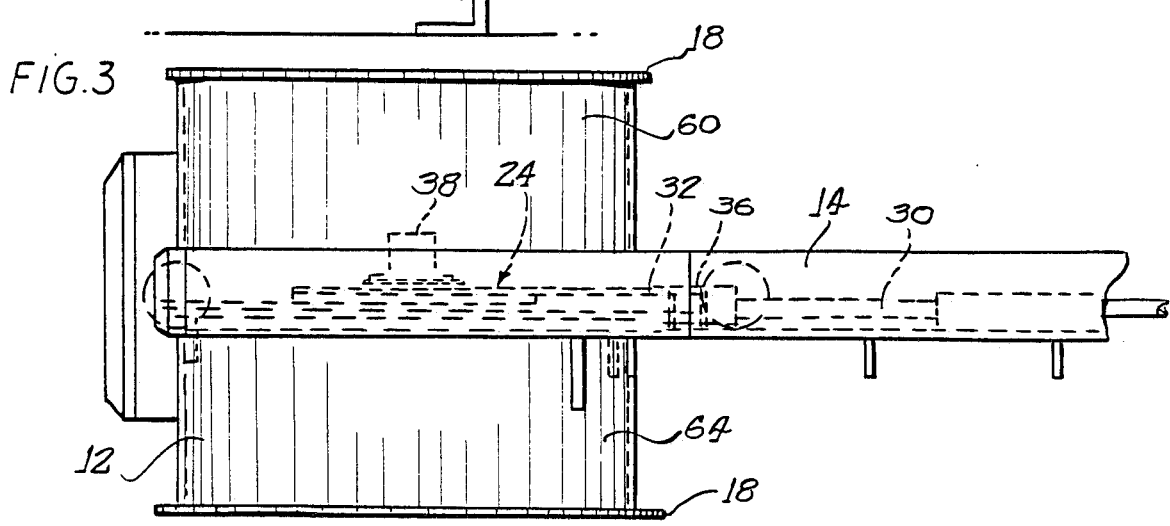

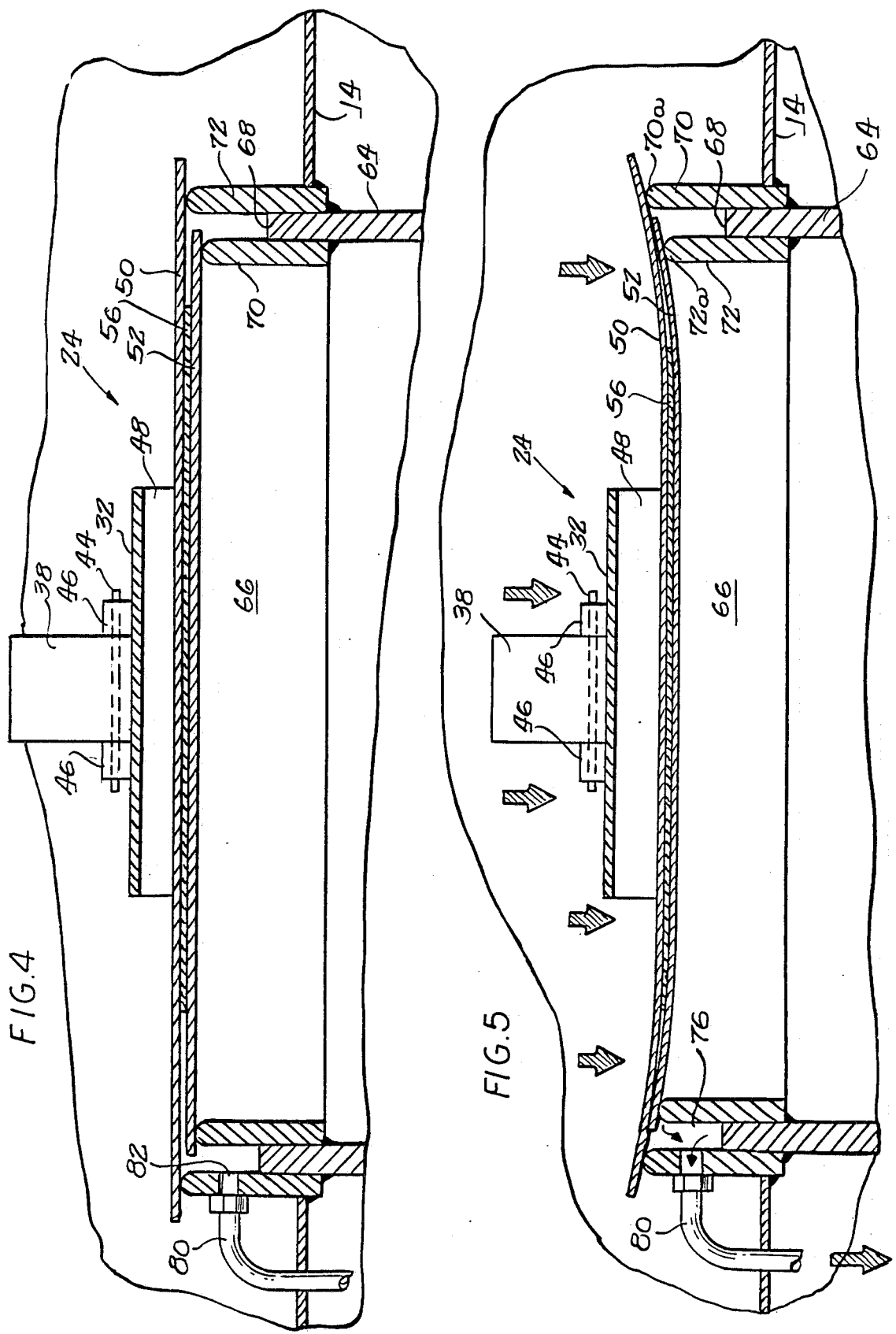

DOUBLE-SEAL FLEXIBLE GATE VALVE

BACKGROUND OF THE INVENTION

1. Field of the Invention

The present invention pertains to gate valves, and in particular to gate valves of relatively large size, up to several feet in diameter.

2. Brief Description of the Prior Art

Prior art gate dampers or valves have been employed to provide sealing for conduit systems of relatively large effective flow diameters, typically ranging from one to six feet. One particular type of gate damper employs a flexible plate brought into and out of contact with a discharge outlet of a valve. The gate is typically held in place against the discharge orifice by upstream pressures. The flexible gate, carried by a rigid bar into and out of contact with the discharge outlet, is spaced slightly upstream of the discharge outlet throughout much of its travel. The box has wedge-shaped camming surfaces on either side of the flexible plate. As the flexible plate is brought into contact with the discharge outlet, the wedging surfaces of its bar-like carrier force the flexible plate into contact with the discharge outlet with a wedging action. Thereafter, upstream pressure is applied against the flexible plate, aiding in sealing engagement between the flexible plate and discharge outlet.

When employed in some commercial applications, it is essential that the gate damper provide absolute isolation between two fluid or gaseous components. Accordingly, the gate dampers of the above-described type have been adapted to provide a double sealing in a valve body. The double sealing arrangement was provided in a valve body having an inlet as well as a discharge outlet. Basically, the flexible gate arrangement described above was duplicated to leave a mirror image facing the inlet orifice. As an option, the space between the mirror-image flexible gates was enclosed to provide a purging chamber. However, the purging chamber was relatively large, covering not only the entire area between the pressure gates, but also the area between their rigid, wedging bar-like carriers, and the tracks on which the gates ride, as well as the area of the actuating system used to draw the gates along their tracks, into and out of their sealing positions. The volume of the purging chamber is, therefore, typically quite large, requiring a purging pump of relatively large capacity and a fairly large number of joints or seams which must be maintained free of possible leakage.

SUMMARY OF THE INVENTION

Accordingly, an object of the present invention is to provide a gate valve having a double seal to provide effective isolation between two liquid or gaseous components carried within a conduit system.

Another object of the present invention is to provide a double seal gate valve having a purging chamber of minimal size, and which is economically constructed from a minimum number of inexpensive parts.

These and other objects of the present invention are provided in a gate valve for controlling material flowing in an axial direction. The gate valve has an axially-extending valve body with a discharge orifice of preselected diameter. A gate assembly, including an upstream rigid backup plate of diameter substantially less than that of the discharge orifice, is joined to upstream and downstream spaced flexible sealing disks. Each of the sealing disks is located downstream of the backup plate and each has a diameter greater than that of the backup plate. Valve seat means are located adjacent the valve body orifice for sealingly engaging the sealing disks such that the upstream sealing disk forms a pressure-tight seal upstream of a separate pressure light seal formed with the downstream sealing disk. Valve positioning means move the gate assembly so as to bring the upstream and the downstream sealing disks into and out of engagement with the valve seat means.

BRIEF DESCRIPTION OF THE DRAWINGS

In the drawings, wherein like elements are referenced alike,

FIG. 1 is a perspective view of a gate valve apparatus embodying the principles of the present invention;

FIG. 2 is a front elevational view of the gate valve of FIG. 1;

FIG. 3 is a plan view of the gate valve of the preceding Figures;

FIG. 4 is a fragmentary cross-sectional view taken along the line 4—4 of FIG. 2 and looking in the direction of the arrows, showing the double seals at the initial stages of sealing engagement with a discharge orifice of the valve body; and FIG. 5 is a fragmentary cross-sectional view similar to that of FIG. 4, but showing the double seals in a fully seated condition.

DETAILED DESCRIPTION OF THE PREFERRED EMBODIMENT

Referring now to the drawings which are presented for purposes of explanation but not limitation, a gate valve apparatus 10 is illustrated as having a valve body 12, a gate enclosure 14 and a valve actuator 16. The valve body 12 includes mounting flanges 18 for connection to a piping or conduit system containing a flow of liquid and/or gaseous materials. The valve body 12 is of a relatively large diameter, typically ranging between one and six feet, and can be constructed to have even larger diameters. Referring to FIG. 1, the numeral 20 is applied to an arrow indicating the direction of flow of material through the valve body of the gate valve apparatus 10.

Referring now to FIG. 2, a gate assembly generally indicated at 24, is moved by an actuator 16 in the directions of arrow 26, into and out of blocking arrangement with valve body 12. The solid lines in the left-hand portion of FIG. 2 indicate the gate assembly in its closed or blocking position, obstructing the flow through valve body 12. The phantom lines shown in the right-hand portion of FIG. 2, indicate the gate assembly in its retracted or open position. The actuator mechanism 16 used to move the gate assembly 24 between its open and closed positions includes a handle 28 which, when rotated, drives an actuator shaft 30 back and forth in the directions of arrow 26 (see FIG. 2).

The actuator shaft 30 is pinned to a plate-like arm 32 with a clevis 36, illustrated in FIGS. 2 and 3. The gate assembly 24 rides in tracks (not shown) within gate enclosure 14, as it moves between closed and open positions. As illustrated in FIGS. 4 and 5, camming bar 38 is pivotally connected to arm 32 and the balance of the gate assembly through rod 44 pivotally connected to camming bar mounting blocks 46, rigidly attached to arm 32. Operation of the camming bar 38, its inclined surfaces, and the pivotal mounting to the gate assembly will become apparent in light of the further description herein. The camming bar 38 has arm-like ends 40 axially extending from the ends of camming bar 38 in an upstream direction. The arms 40 have beveled or inclined surfaces for mating with inclined bars attached to a portion of valve body 12 located upstream of the discharge orifice. As gate assembly 24 approaches finalization of its seating on the valve body, the inclined surfaces at the ends of camming bar 38 engage inclined surfaces of bars attached to upstream portions of valve body 12, thereby wedging camming bar 38 in a downstream direction so as to force valve gates against the discharge orifice located on the downstream side of the valve gate. The arrangement of the camming bar 38 having arms 40 on its end with inclined surfaces, and the mating arrangement of bars having inclined surfaces on upstream portions of the valve body, are well-known in the art and are substantially as shown and described in U.S. Pat. No. 4,131,131, which is herein incorporated by reference to the extent necessary to attain a complete understanding of the present invention.

Referring especially to FIGS. 4 and 5, the gate assembly 24 includes an upstream rigid backup plate 48 or disk 48 having a diameter substantially smaller than the inner bore of valve body 12. Upstream and downstream, spaced flexible sealing disks for gates 50, 52 have diameters more closely approximating the inner bore of valve body 12. The disks 50, 52 are spaced apart from each other in the direction of flow by a spacer plate 56 which can be formed of material either rigid or pliable relative to the gates 50, 52. The gates 50, 52, the spacer plate 56, the back-up disk 48, the arm 32 and mounting blocks 46, are fabricated to form a unitary assembly which moves as a single piece, under the translation displacement of actuator shaft 30.

The gates 50, 52 are formed of relatively flexible material such as carbon steel, stainless steel or the like material. The material from which the gates 50, 52 are formed is sufficiently flexible so as to bow under pressure, forming a generally dish-shaped or concave deformation when viewed from an upstream position, as indicated in FIG. 5. The bowing of gates 50, 52 takes place under the force of pressurized material in the valve body upstream of the gate assembly 24, and also results from the aforementioned wedging displacement of camming bar 38 in a downstream direction.

The rigid backup plate 48 can alternatively be interposed between gates 50, 52 so as to thereby comprise a rigid spacer plate. In order to prevent separation of the upstream gate 50 from the backup plate, due to the application of tensile forces applied therebetween when the gate is placed under load, the upstream gate and pressure plate (as well as the downstream gate 52) must be securely fastened together by adhesive, rivets, welding or the like. In order to provide the desired control over the concave deformation of the upstream flexible disk 50, it is preferred that all radial portions of upstream plate 50, (e.g., wedge-shaped portions originating in the center of plate) be securely fastened or otherwise held in intimate engagement with the backup plate, as by securing the entire periphery of the backup disk or a sufficient number of portions thereof to the gates so as to maintain intimate engagement therewith even under load. Of course, the backup plate can be located downstream of both flexible sealing disks, as long as it is securely fastened thereto in the manner indicated above.

Referring to FIGS. 4 and 5, the downstream portion 64 of valve body 12 forms a discharge orifice 66 at its upstream free end 68. Annular inner and outer valve seating rings 72, 70, extend beyond free end 68 in an upstream direction, being radially spaced apart from each other by a distance generally equal to the thickness of downstream valve body portion 64. Valve seating rings 70, 72 are typically formed from stainless steel or higher alloys, but other suitable materials may also be used. As illustrated in FIGS. 4 and 5, the upstream free ends 70a, 72a of valve seating rings 70, 72 are rounded so as to form a high pressure line contact with gates 50, 52 and to provide a self-cleaning wiping action as the gates are bowed as illustrated in FIG. 5.

The seating rings 70, 72 and the valve body portion 64 form a chamber enclosing the sealing contact between the gates and their corresponding sealing rings. The chamber is generally indicated by the numeral 76 and provides a cavity or container means for intercepting any seepage leaking past the upstream seal formed between gate 50 and its corresponding seating ring 70. The chamber 76, as illustrated at the left-hand portion of FIGS. 4 and 5, can be evacuated by means of a vacuum line 80 communicating with the interior of chamber 76 through an aperture 82 formed in the radially outer seating ring 70. Thus, any seepage flowing past the upstream seal is at least stored in chamber 76 and is preferably removed via line 80 so as to prevent any risk of penetrating the downstream seal formed between gate 52 and its corresponding radially inner seating ring 72. If desired, chamber 76 can alternatively be pressurized with an inert buffer medium, either liquid or gas, through line 80, to prevent mixing of materials upstream and downstream of the gate assembly 24.

Several advantages are realized by the chamber 76 formed between the double seal arrangement. Referring again to FIGS. 4 and 5, the numeral 14 is applied to the visible fragment of the gate enclosure corresponding to the downstream wall thereof. The remaining portion of the gate enclosure, not shown in the Figure, surrounds the entire portion of the gate valve apparatus upstream of wall 14, as well as that portion of the gate enclosure lying to the right of the valve body 12, as indicated in FIG. 1. Previously, the entire interior of the gate enclosure had to be evacuated or pressurized to provide a retention chamber between mirror image, dual arrangements of camming bars, backup plates and gates, with one gate assembly mating with an orifice of the upstream valve body portion 60, and the other gate assembly mated with the downstream valve body portion 64. Compared to the interior of gate enclosure 14, chamber 76 of the present invention is remarkably smaller and as can be readily appreciated, is conveniently formed from a minimum number of inexpensive components to provide a reliable leak-proof enclosure between the upstream and downstream valve seats. Other advantages are also realized by the double seal construction. For example, the gate valve apparatus according to the present invention, offers improved performance for high-pressure systems, in that the downstream gate 52 reinforces and otherwise keeps upstream gate 50 from excessive deformation upon application of high pressures to its upstream side.

As illustrated in FIG. 5, the downstream gate 52 can be configured to contact the outer periphery of upstream gate 50, touching the downstream surface thereof. If desired, downstream gate 52 can be made more rigid so as to avoid contact with the upstream gate 50. As most clearly seen in FIGS. 1 and 5, the valve seating rings 70, 72 are staggered in both axial and radial directions. If desired, the amount of staggering can be increased to avoid contact between the gates 50, 52 or to reduce any resistance imparted by gate 52 to gate 50, against the desired seating of gate 50 with the outer valve seating ring 70.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A gate valve for controlling flow in an axial direction, comprising:
    an axially-extending valve body having a discharge orifice of preselected diameter;
    a gate assembly including a spacer disk, a rigid backup plate of diameter substantially less than that of said discharge orifice joined to upper and lower flexible sealing disks spaced apart by the spacer disk, each of said sealing disks having an outer diameter greater than that of said backup plate and of said spacer disk;
    valve seat means comprising radially inner and outer annular valve seating rings, with said inner ring having a sealing surface below that of said outer ring so as to be offset therefrom, said rings attached to said valve body adjacent said discharge orifice for sealingly engaging said sealing disks such that the upper sealing disk forms a pressure-tight seal with said outer ring and a separate pressure-tight seal is formed with said lower sealing disk and said inner ring, the upper and lower sealing disks being deflected when seated against the seating rings so as to have concave configurations for achieving a wiping action across the sealing surfaces which is defined by the offset of said sealing rings;
    valve positioning means for moving said backup plate in downstream and upstream directions so as to bring said upper and lower sealing disks into and out of engagement with said outer and inner valve seat rings, respectively; and
    said valve seat means defines chamber means between the pressure-tight seals formed with said upstream and said downstream sealing disks, for receiving seepage flowing past at least one of said seals.

2. The valve of claim 1 further comprising means for channeling seepage in said chamber away from said valve.

3. The valve of claim 2 further comprising means of or evacuating said chamber.

4. The valve of claim 1 further comprising means for pressurizing said chamber so as to prevent seepage from entering therein.

5. The valve of claim 1 wherein said chamber means comprises an annular support collar having radially inner and outer surfaces adjoining said inner and said outer valve seating rings, respectively, which extend from said support collar, and said inner and said outer valve seating rings having sealing surfaces for pressure-tight sealing with said upper and said lower flexible sealing disks.

6. The valve of claim 1 wherein said valve positioning means comprises a bar having a central portion pivotally attached to said rigid back up plate and a pair of parallel projections axially extending from opposite ends thereof, each projection having a camming surface thereon, and a pair of positioning members fixed to said valve body and having inclined surfaces for engaging said camming surfaces to deflect said upper and lower disks so as to have concave configurations when viewed from an upstream position and so as to bring said rigid backing plate in a downstream direction so as to bring said flexible sealing disks into sealing engagement with their respective valve seat means.

7. The valve of claim 1 wherein each of said sealing disks are located downstream of said backup plate.

8. The valve of claim 1 wherein said backup plate is located upstream of one said sealing disk.

* * * * *

UNITED STATES PATENT AND TRADEMARK OFFICE
CERTIFICATE OF CORRECTION

PATENT NO. : 4,785,844

DATED : November 22, 1988

INVENTOR(S) : Ivan Pankov

It is certified that error appears in the above-identified patent and that said Letters Patent is hereby corrected as shown below:

Claim 5, Column 6, lines 13-14, change "of or" to ---for---.

Signed and Sealed this

Eleventh Day of April, 1989

Attest:

DONALD J. QUIGG

*Attesting Officer*

*Commissioner of Patents and Trademarks*